United States Patent [19]
Ford

[11] Patent Number: 6,138,750
[45] Date of Patent: Oct. 31, 2000

[54] WATER WELL STAGNANT BOTTOM REHABILITATION MEANS AND METHOD

[76] Inventor: William M. Ford, 1507 Clayton Rd., San Jose, Calif. 95127

[21] Appl. No.: 09/107,076

[22] Filed: Jun. 29, 1998

Related U.S. Application Data

[60] Provisional application No. 60/051,353, Jun. 30, 1997.

[51] Int. Cl.[7] .................................................. E21B 21/00
[52] U.S. Cl. ................................ 166/53; 166/312; 417/38
[58] Field of Search .......................... 166/312, 53; 417/38

[56] References Cited

U.S. PATENT DOCUMENTS

| | | | |
|---|---|---|---|
| 1,432,425 | 10/1922 | Symons | 166/312 |
| 4,132,268 | 1/1979 | Darrison | 166/53 |
| 4,462,758 | 7/1984 | Speed | 417/38 |
| 4,741,357 | 5/1988 | Battel et al. | 137/387 |
| 4,972,709 | 11/1990 | Bailey, Jr. et al. | 73/290 R |
| 5,064,347 | 11/1991 | LaValley, Sr. | 417/9 |

*Primary Examiner*—Eileen D. Lillis
*Assistant Examiner*—John Kreck
*Attorney, Agent, or Firm*—John J. Leavitt

[57] ABSTRACT

An apparatus and method of rehabilitating the stagnant bottom of water wells using existing well equipment including a pump and a pressure tank, augmented by valves and a conduit that extends from the surface to near the bottom of the stagnant region at the well bottom. Water pumped from the well is returned under pressure to the well bottom where it displaces the fouled contents of the stagnant region at the well bottom. This elevates the contents of the well bottom to a position above the pump intake, where the contents can then be pumped to waste.

4 Claims, 3 Drawing Sheets

WATER WELL STAGNANT BOTTOM REHABILITATION MEANS AND METHOD

This application claims benefit of Provisional Appl. 60/051,353 filed Jun. 30, 1997.

BACKGROUND OF THE INVENTION

1. Field of the Invention

This invention relates to water wells, the type used for residential water supply, and particularly to a means and method for remediating the well by extracting and disposing of fouled water from the bottom of the well, and then rinsing the bottom of the well to remove all vestige of contamination.

2. Description of the Prior Art

A prliminary patentability and novelty search has revealed the existence of the following United States patents, and the United States and foreign patents and publications cited therein:

U.S. Pat. Nos. 4,966,654 5,025,822 5,069,796

U.S. Pat. Nos. 5,302,286 5,688,076 5,741,427

A careful review of these patents indicates that the means and method disclosed herein for remediation of fouled water wells, such fouling commonly found at the bottom of residential water wells, has not been disclosed or even suggested by the prior art.

Thus, U.S. Pat. No. 4,966,654 relates to a means and method for the extraction of volatile hydrocarbon contaminants from both water and moisture laden air, utilizing a stripping system in which steam is mixed with the contaminated water at below atmospheric pressure, thus providing clean water for re-use and contaminated steam and vaporized contaminants for disposition in a proper manner.

U.S. Pat. No. 5,025,822 involves a method and apparatus for delivering a disinfectant in liquid form into a well to disinfect the water in the well.

U.S. Pat. No. 5,069,796 relates to an apparatus that may be mounted on a skid-frame and transported to a well site. Water from the well is then processed in a spray tower, where it is countercurrently contacted with air to remove volatile contaminants. Neither the means nor the method by which the means operates, or the end result have any reasonable relevancy to the invention disclosed and claimed herein.

U.S. Pat. No. 5,302,286 relates to a method and apparatus for in situ ground water remediation in a well having two permeable sections in the ground water saturated zone. Ground water is re-circulated through the well and the saturated zone between the two permeable sections of the casing, and nutrients such as oxygen and methane, are added to the ground water as it flows into the well. Again, there is no reasonable relevancy between this method and apparatus and the invention disclosed and claimed herein.

U.S. Pat. No. 5,688,076 relates to ground water and soil remediation in association with wells, but uses a high vacuum system for extracting soil, vapor and ground water contaminated with hydrocarbons. Means are provided for protecting the vacuum system from non-gaseous phases and for transferring liquid phases to fractionation subsystems.

U.S. Pat. No. 5,741,427 describes a method for treating contaminants in soil and/or ground water by adding a source of an oxidizing agent and a reaction product complex or a ligand donor and a metal catalyst to the in situ environment and the reaction product complex employed therein. Nothing has been found in this patent that would even suggest the method and means disclosed and claimed herein for remediating residential type water wells, the water of which at the bottom of the well is fouled by various substances, including soil and bacteria of various forms.

Heretofore, the conditions leading to the fouling of water wells, particularly residential type water wells that are usually located in isolated locations away from metropolitan areas, has not been well understood. The general misconception has been the belief that fouled water is the result of the entire well being contaminated, or that the source of water seeping into the well is contaminated, thus contaminating the water even before it reaches the well. Investigation has led to the discovery that the fouling of most residential type water wells is the result of the accumulation of debris in a stagnant region below the well pump, which is usually of the submersible type. The water above the pump is pushed into the pump by the pressure of the water above the pump intake. The pressure of the water above the pump is proportional to the vertical height between the pump and the static level of the water table. This pressure is generally about 0.5 PSI per foot of water depth. For a pump located fifty feet below the water table, this pressure is about twenty-five pounds per square inch.

The water below the intake of the pump, which has zero pressure forcing it into the pump intake, makes up only a small fraction of the water pumped from the well, and is only slightly disturbed, if at all, by the pumping action. Generally, the depth of this stagnant region below the pump is about ten feet. The stagnant region is eventually filled with sediment and debris of various types, and in the case of bacterial infection, the detritus of bacterial activity. The water in this region becomes muddy and foul. Many wells are infected with bacteria, some of which are pathogenic and others merely putrescent. Those bacteria which metabolize iron or manganese cause the water to stain fixures and laundered clothing, make the water slimy to the touch and cause sulfur oxides to be reduced, forming hydrogen sulfide, which results in a noxious rotten egg odor. Most of the products of bacterial activity are found in the stagnant region at the bottom the well.

At the interface of the stagnant region (just below the pump intake port) and the active region (just above the pump intake) the water entering the pump picks up a small amount of the fouled water from the stagnant region. In severe cases, the fouled water is sufficient to contaminate the produced water to the extent that the water is unusable and therefore not potable. Heretofore, attempts to remediate a fouled well has included bailing the mud and sediment out of the well, blowing high pressure air and water into the well in an attempt to blow out the contaminated water, sanitizing the well with oxidizers such as chlorine and ozone, and providing a holding tank for settling out the sediment, etc. None of these treatments have been found acceptable, and many wells remain fouled and provide constant irritation to the occupants of a residence, and require constant effort on the part of the resident to ameliorate the stains that adhere to fixures, walls and laundered clothing.

Accordingly, one of the important objects of the present invention is to provide a method and means that removes contaminated water from a well and removes the source of contamination of the water produced from wells by cleaning the stagnant region of the well below the pump.

Another object of the invention is to provide a means and method for removing the detritus contained in the region of the well below the level of the pump.

Still another object of the invention is to provide a permanent apparatus installed in association with a well to provide a means and method for the automatic periodic cleaning, i.e., remediation, of the water and stagnant region below the pump.

The invention possesses other objects and features of advantage, some of which, with the foregoing, will become apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the method and means forming the subject matter hereof for remediating fouled well water and fouled regions at the bottom of wells, particularly in residential water wells that use water from the well as the only economically feasible source of potable water for the many purposes for which water is used, is to elevate the level of the fouled water at the bottom of a well to a level at least as high or above the existing pump intake so that the fouled water can be pumped out of the well. Means are provided to seal off existing pump equipment so that it will not be contaminated by the foul water that is pumped from the well. The apparatus includes a conduit extending into the well's bottom region, where sedimentation usually collects, for the purpose of introducing under pressure sufficient water to displace the contents of the stagnant bottom region and raise it above the pump where it can be pumped to waste. Means are provided for automatically energizing the remediation system at times when water is not normally drawn from the well, such as between midnight and dawn, for instance.

DESCRIPTION OF THE PREFERRED EMBODIMENTS

Figure 1:
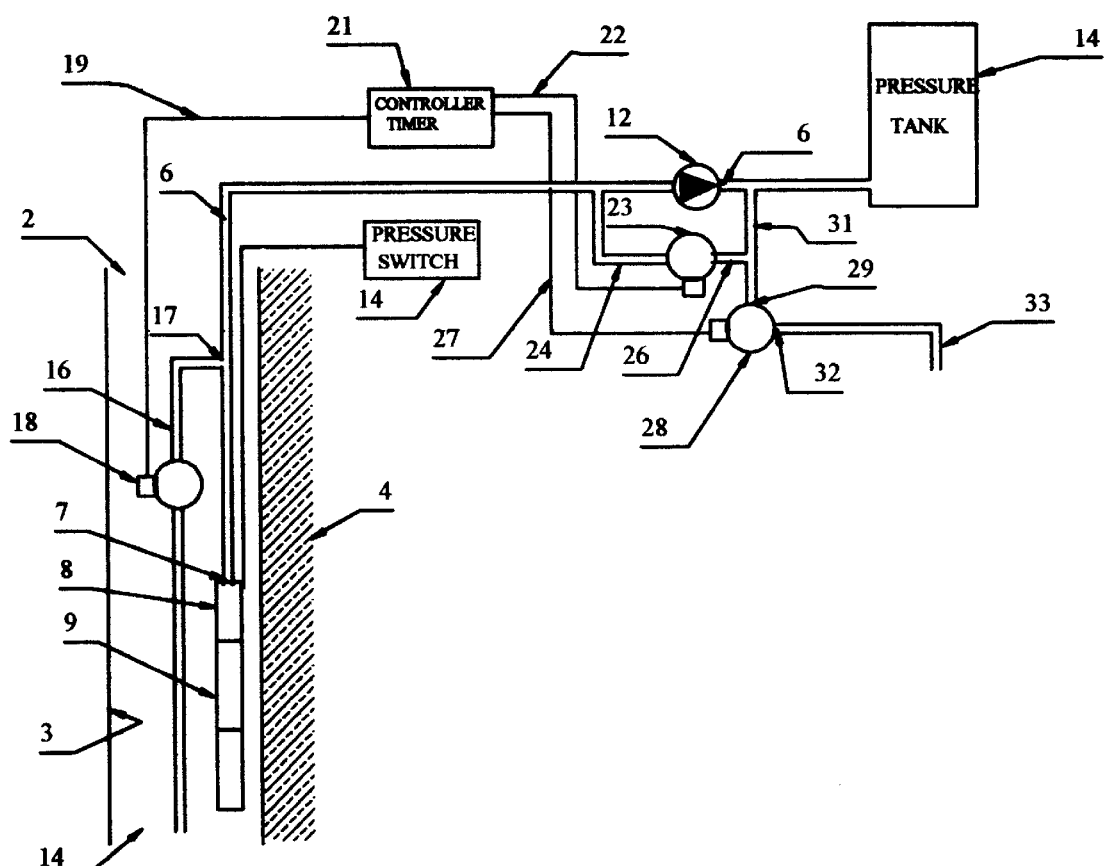
FIG. 1 is a diagrammatic view of the apparatus utilized to remediate the bottom of a water well by removing the contaminated water and sedimentation and cleaning the bottom region of the well where fouled water and sedimentation are usually contained.

In terms of greater detail, and referring to the basic diagrammatic view illustrated in FIG. 1, it will there be seen that the water well is designated generally by the numeral 2, and includes a metal casing 3 driven into a bore formed in the surrounding earth 4. The depth of a water well for residential purposes usually is determined by the height of the water table in relation to the surface of the earth into which the well is bored. The expression "water table" is sometimes referred to as the "water level" within the earth of the aquifers, which are defined as any geological formation supplying water for wells.

Thus, where the water table or the water level is "high", meaning that it is relatively close to the surface of the earth, a "well" may be constituted by digging a "cistern" in the earth in the bottom region of which will be collected a body of water that flows into the cistern. From such cisterns, water is usually lifted in buckets raised by a rope by hand or by a winch. In more modern times, water may be extracted from a cistern by an appropriate pump. Where the water table or aquifer lies so far below the surface of the earth that it is impracticable to reach it by way of a cistern, well boring equipment is utilized to bore a hole of specific diameter to a depth that reaches the water table and preferably for a substantial distance into the aquifer, and perhaps even beyond it, so that the bottom region of the bore or well fills with water hopefully as fast as it is withdrawn. In most instances, to prevent the soil from collapsing into and filling the bore that forms the well, the metal casing 3 is driven downwardly through the bore to an appropriate depth that is usually determined by the type of geological formation which the well bore penetrates.

In the normal course of use of a well, with water flowing into the bottom region of the bore forming the well, it is not unusual for sediment and/or debris from the surrounding walls of the bore to find its way into the bottom region of the well bore. In some instances, such sedimentation and debris foul the bottom region of the well to the point that it becomes unusable, or to the point that water pumped from the well is not potable. Under these conditions, the well pump must be "pulled" so that the pump is suspended higher in the well in water that is not contaminated, or the well must be remediated, which is the purpose of the invention disclosed herein.

Thus, again referring to FIG. 1, it will be seen that extending into the well 2 is an existing "string" or conduit 6 which at its lower end is connected to the outlet 7 of an existing submersible pump 8. The pump 8 is provided with a pump intake 9 which admits water into the interior chanber of the pump so that activation of the pump mechanism forces the water under pressure out of the outlet 7 and into the pipe or conduit 6, to be delivered past the check valve 12 and into a pressure tank 13. This type of a system is generally referred to as a "pressure system" for the reason that the electric pump 8 is controlled by a pressure switch 13 that turns the pump on and off, depending upon the pressure generated within the tank by the admission of water and the consequent compression of air within the tank above the water level therein.

Thus, in a conventional residential system, the pressure tank may contain thirty or more gallons of water, and it may be pressurized to a pre-set selected pressure, for instance 60 PSI, that is set by adjustment of the pressure switch 14. When the upper limit of pressure in the pressure tank is reached, the pressure switch deactivates the pump 8. As water is drawn for use from the pressure tank through an appropriate outlet, such as a hose bib, spigot or faucet (not shown), the pressure drops to a pre-set lower limit, also selectively controlled by adjustment of the pressure switch 14, whereupon the pressure switch will again reactivate the pump 8 when the lower pre-set pressure limit is reached. This "system" works cyclically, being activated to pressurize the pressure tank to its upper pre-set limit, then shutting down for an interval until the pressure in the tank is reduced to the lower pre-set limit by withdrawal of water from the tank.

In most instances, the pump 8 is lodged within the well at a depth that causes it to be submerged within the body of clear clean water that lies above the lower level stagnant region of the well adjacent its bottom where the contaminated water and sedimentation are contained, usually below the level of the pump. Over time, however, the stagnant region increases in height to the point that it reaches the intake level of the pump, whereupon stagnant or foul water is pumped from the well. The purpose of this invention, is to periodically or cyclically operate the remediation system forming the subject matter of this invention to eliminate the foul water within the bottom region of the well, and to remediate the stagnant region within the bottom of the well, so that the intake port of the pump 8 will always be submerged in clear non-contaminated water.

To effect such decontamination and remediation of the well, the system disclosed and claimed herein, as illustrated diagrammatically in FIG. 1, includes an elongated conduit 16 that at its upper end 17 is connected to and communicates with the interior of conduit 6 that is connected at one end to the outlet port of the pump 8. From its connection to the conduit 6, the pipe 16 extends downwardly into the well past the pump 8 and pump intake 9 to near the bottom of the well, and is provided intermediate its length with an electrically activated solenoid valve 18 controlled by electric power transmitted through a lead 19 terminating in the controller/timer 21. The controller/timer 21 is also connected by lead 22 to an electrically actuated by-pass solenoid valve 23, which is in turn connected by conduits 24 and 26 to the main conduit 6 that terminates at its outlet end in the pressure tank 13. The by-pass conduits 24 and 26 are connected to and communicate with the conduit 6 on opposite sides of the check valve 12 for the purpose of shunting water around the check valve when the solenoid valve 23 is opened, as will hereinafter appear.

Additionally, the controller/timer 21 is connected by a lead 27 to a third electrically actuated solenoid valve 28 the input port 29 of which is connected by a conduit 31 to the main conduit 6 as shown. The output port 32 of the solenoid valve 28 is connected to an appropriate conduit 33 that is adpated to discharge contaminated or foul water and sludge from the system onto the ground or into an appropriate receptacle (not shown).

In operation, assume that the pressure switch 14 is set to turn the pump 8 OFF when the pressure in the tank 13 reaches its upper set limit of say 60 PSI, and to turn the pump 8 back ON when the pressure in the pressure tank drops to say 40 PSI. It must be understood that the sediment at the bottom of the well is intended to ultimately be pumped out of the well and to the surface and to be dumped onto the ground or into an appropriate waste container. However, in order to pump the sediment to the surface, the sediment must be elevated to a position in the well above the pump 8 from whence it can be pulled into the pump. To stir and elevate the sediment from the bottom of the well into the body of well water above the pump 8, solenoid valves 18 and 23 are opened, allowing water from tank 13 to by-pass check valve 12 and run through open valve 18 and into the sediment in the bottom of the well, stirring it up and causing a limited amount of admixture of elevated sediment and water. When the pressure tank pressure reaches its lower set point limit, the pump is turned ON by the pressure switch. Since the downwell solenoid valve 18 is already open, as is the valve 23, water continues to run into the well from tank 13 and water is also pulled into the pump intake 9 and is forcefully ejected from the pump through the outlet port 7, thence into the conduit 16, through the open solenoid valve 18 and into the bottom of the well, forcefully stirring the sediment into the elevated body of water in the well above and below the pump. This stirring process is maintained for a predetermined and adjustable interval calculated to thoroughly intermix the sediment with the water content in the well from below to above the pump. The electrically operated solenoid valves 18 and 23 are retained open while the pump is maintained activated, thus sustaining the stirring effect of the sediment-laden water.

The level of the dirty water raised above the pump intake depends on the volume of water injected initially from the pressure tank, then from the pump once the pump is activated. Obviously, the smaller the diameter of the well bore, the higher the sediment-laden water is displaced by the water from the pressure tank. This dirty water must now be pumped out of the well. The downwell solenoid valve 18 is electrically closed. With the solenoid valve 18 closed and solenoid valve 23 open and the pump still running, the waste water solenoid valve 28 is electrically opened and the contaminated and dirty water surrounding the pump 8 is pumped through the by-pass solenoid valve 23 and to the waste line or conduit 33 from whence it is dispersed onto the ground, or discharged into an appropriate container. This process is cyclically repeated until the water in the bottom of the well is as clear as the water entering the well from the aquifers.

It has been found that it is sometimes advisable to inject an appropriate sterilizing chemical into the bottom of the well. To effectively accomplish this procedure, a pressurized source of disinfectant, such as a chlorine solution for example, is connected to the outlet conduit 33 through an appropriate fitting (not shown). Solenoid valves 18, 23 and 28 are simultaneously electrically opened, and the disinfectant is then forced under pressure through the conduit 31 into the by-pass conduits 24 and 26, and thence into the conduit 6 and into downpipe 16 to the bottom of the well. Thereafter, following a limited interval during which the disinfectant is performing its function in the contaminated region of the well below the pump, a cyclical flushing or rinsing process is initiated to flush out and rinse the previously contaminated region of the well below the pump, including traces of the disinfectant that has been used to sterilize the well bore. This is effected under the control of timer 21 so that the stagnant region below the pump and at the bottom of the well is cleaned periodically, weekly for example, by means of the controller/timer 21 in cooperation with the means described above, electrically activating the solenoid valves 18, 23 and 28 in the proper sequence to repeatedly perform the process described above.

Figure 2:
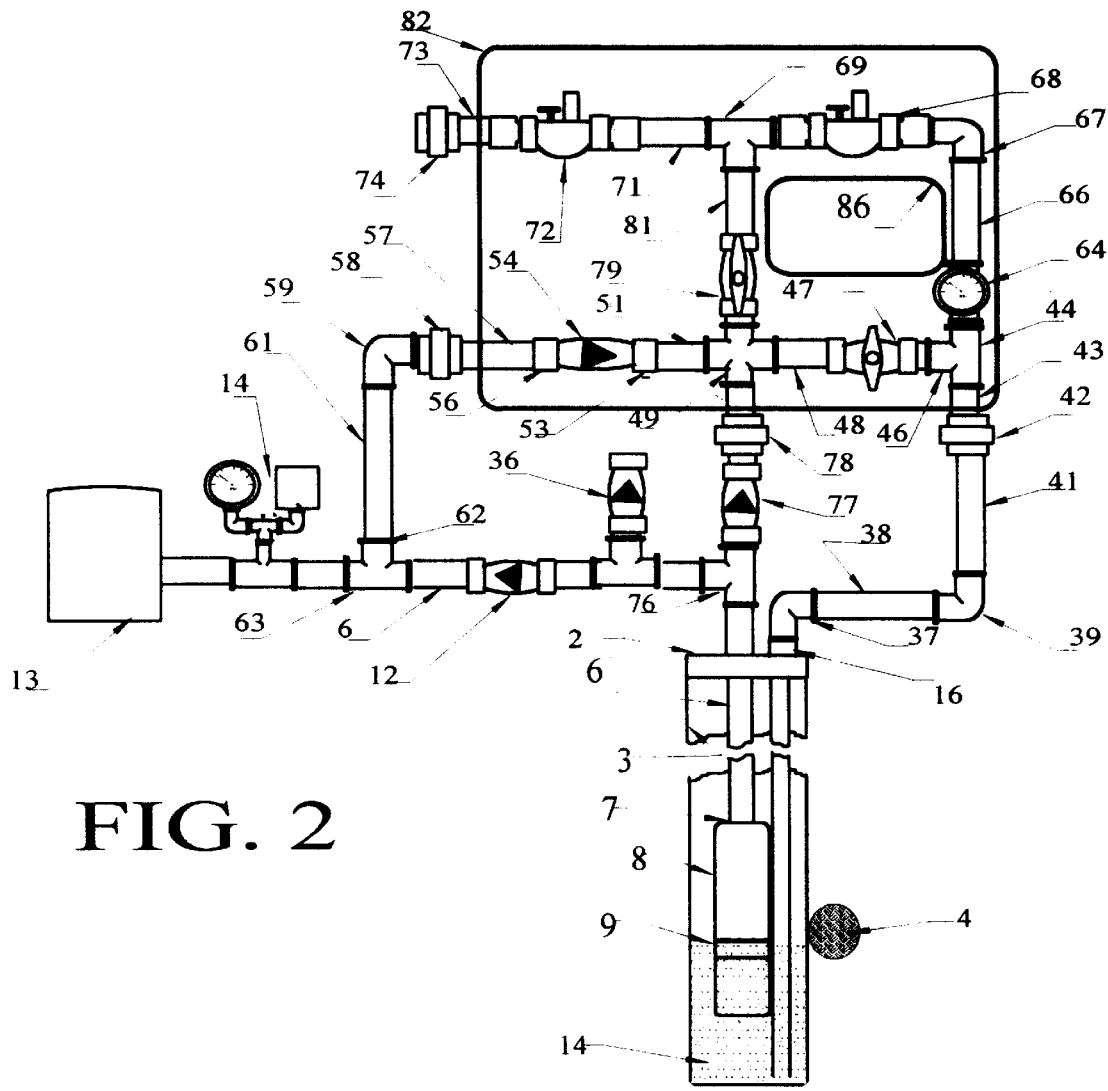
FIG. 2 is a more detailed diagrammatic illustration of the apparatus utilized to practice the method for remediating a water well.

A second and preferred embodiment of the invention is illustrated in FIG. 2, differs somewhat from the embodiment of the invention as illustrated in FIG. 1. Referring to FIG. 2, corresponding reference numbers are applied to corresponding structural elements of the apparatus. Thus, it will be seen that the well 2 is provided with a casing 3 as before, and that the casing 3 is surrounded by soil 4 into which the well bore is drilled. Descending into the well 2, as before, is a conduit 6 the lower end of which, within the well as before, is connected to the outlet 7 of an electrically driven submersible pump 8 having an intake port 9. Outside the well, the conduit 6 continues through an elbow and is provided with a check valve 12 from whence the conduit 6 continues to a pressure tank 13 equipped with a pressure switch 14 as before.

In the embodiment of the invention illustrated in FIG. 2, the conduit 6 is provided with a pressure relief valve 36 having a pressure set point slightly above the upper limit set point provided by the pressure switch 14 for the pressure tank 13. As previously discussed, the pressure tank 13 may be filled to a pressure of approximately 60 PSI and contain approximately 30 gallons of water.

In contrast to the embodiment illustrated in FIG. 1 diagrammatically, the downwell conduit 16 in this embodiment extends into the well past the submersible pump 8 but is not provided at its lower end with an electrically controllable solenoid valve in the manner indicated in the embodiment of the invention illustrated in FIG. 1. In the embodiment of FIG. 2, all operative mechanisms except the pump are located above ground or out of the well. Thus, the downwell conduit 16 is connected outside of the wellhead to a pipe or conduit elbow 37 to which is connected a short length of pipe or conduit 38, sometimes referred to as a "nipple" which, at its opposite end from the elbow 37, is connected to another elbow 39 to which in turn is connected a conduit 41 on the opposite end of which is mounted a pipe union 42. The opposite end of the pipe union is connected by a short nipple 43 to a pipe "T" member 44, the right angle. stem 46 of which is connected to the output port of a manually operable surge valve 47. The input part of the surge valve 47 is connected by a conduit or nipple 48 to opposed inlet and outlet ports of a cross-fitting 49 and a coupling conduit 51 to the outlet port 53 of a check valve 54 possessing a "cracking" pressure of approximately 35 PSI. The inlet port 56 of the check valve 54 is connected by a conduit 57 to a union 58, the opposite end of which is connected by an appropriate coupling to an elbow 59, which is in turn connected by a conduit 61 to the right angle port 62 of a pipe "T" 63 included in the conduit 6 as shown.

Again referring to FIG. 2, it will be noted that the pipe "T" 44 is connected to a surge pressure indicator 64, which is connected by appropriate conduit 66 and elbow 67 to an electrically operable solenoid surge valve assembly 68. Through a pipe "T" 69, the surge solenoid 68 is connected by a conduit 71 to a an electrically operable rinse solenoid valve assembly 72, the outlet port of which is connected by appropriate conduit 73 and a pipe union 74 to an appropriate conduit (not shown) adapted to discharge contaminated water and sludge onto the ground or into an appropriate container for subsequent disposal.

From FIG. 2, it will be seen that the conduit 6 that extends into the well and which supports the submersible pump 8 communicates through a pipe "T" 76 with an auxiliary pump check valve 77, the opposite end of which is connected by an appropriate pipe coupling and a pipe union 78 to the cross-coupling 49. The cross-coupling 49 is also connected by an appropriate pipe coupling to a normally open emergency shut-off valve 79. From the emergency shut-off valve, a conduit 81 connects the emergency shut-off valve to the pipe "T" 69 as shown. Preferably, all of the plumbing and programming apparatus is contained within a control housing designated generally by the numeral 82 and constituting an enclosure that contains the operative elements of the combination which are connected to appropriate conduit outside the enclosure by appropriate unions 42, 58, 74 and 78.

Figure 3:
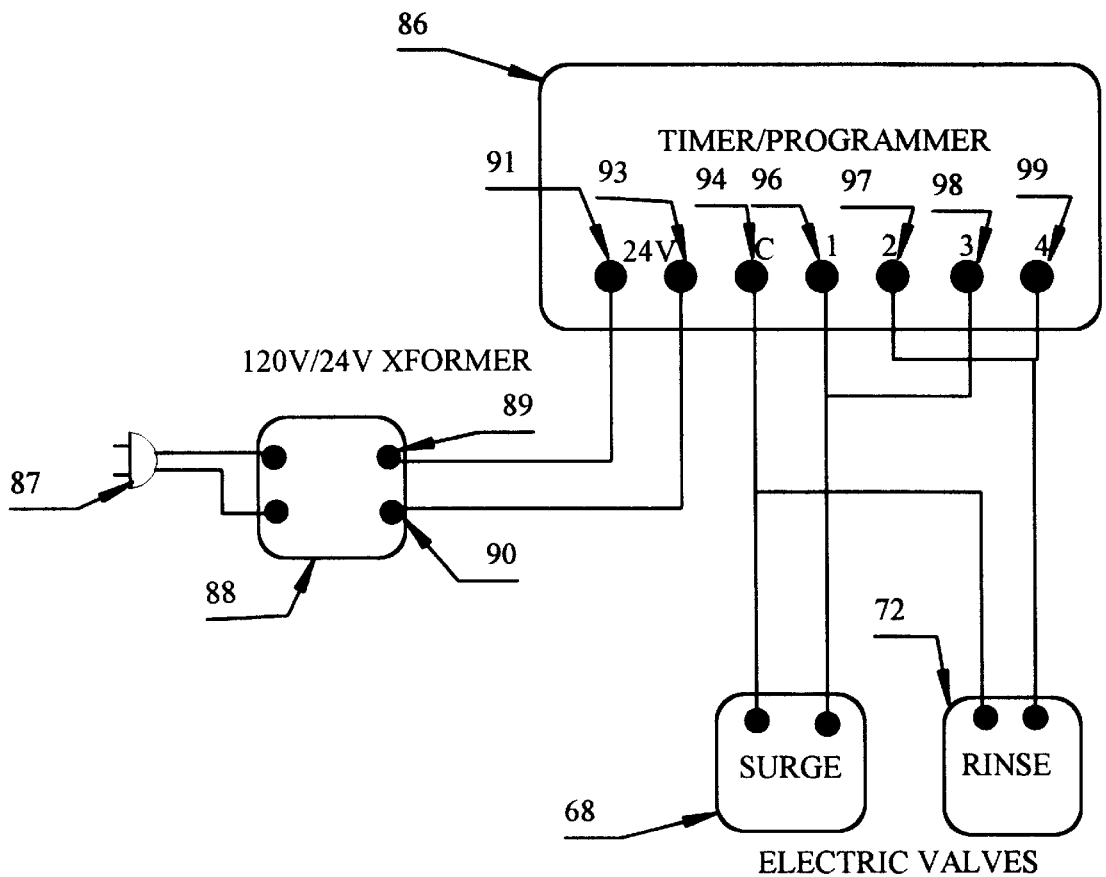
FIG. 3 is a simplified schematic of the control circuit for periodically and essentially automatically energizing the remediation system to expel fouled water from the bottom of the well and to rinse contaminants from the bottom of the well so as to maintain the well as a source of potable water.

The panel-mounted controller/timer for controlling the sequence of operation of the system described is also contained within the enclosure 82 and is illustrated diagrammatically in FIG. 3. As there shown, the controller/timer designated by the numeral 86, may constitute the type of control unit sold under the trademarks RAINBIRD or TORO for controlling lawn and shrub water sprinklers, and which includes multiple set points for setting the sequence of occurrence of specific water sprinkling functions, but here used for a different purpose. This type of controller/timer 86 is available commercially and is adapted to be programmed by the user to perform whatever functions are desired, such as watering lawns, shrubs and trees, or as here activating well remediation apparatus according to a pre-set sequence. As illustrated in FIG. 3, the control housing includes a controller/timer connected to a source of 120 volt electric power through the plug 87 the leads of which are connected to a 120 V/24 V transformer 88, the low voltage output terminals 89 and 91 of which are connected to terminals 92 and 93 within the housing of the control system. The terminals 92 and 93 within the control housing are connected to the controller/timer, and from the controller/timer, appropriate electrical connections are made to the common terminal 94 and sequence controlling terminals 96, 97, 98 and 99. As shown in the diagram of FIG. 3, when the controller energizes the circuit including contacts 94 and 96, the electrical surge valve 68 is energized for a finite time controlled by the timer. In like manner, when common terminal 94 and terminal 99 are interconnected and energized by the controller in cooperation with the timer, the rinse solenoid valve 72 is energized, i.e., opened. It will of course he understood that the surge valve 68 and the rinse valve 72 may alternately be energized so that each is open or closed while the other is not energized, or both the surge and the rinse valves may be energized or deenergized simultaneously so that both of these valves are open or closed at any given time controlled by the controller/timer cooperating one with the other in the manner previously set by a human operator.

In operation of the embodiment of the invention illustrated in FIG. 2, let us assume that the pressure tank 13, at the beginning of the remediating operation is filled with water to a capacity of about 30 gallons and a pressure of approximately 60 PSI, whereupon the pressure switch 14 has deactivated the pump 8. The check valve 12 prevents water under pressure from the tank 13 from running back through the conduit 6 which is of course filled with water at the pressure of the water within the pressure tank, i.e., 60 PSI. Consider also that the emergency shut-off valve 79 is normally open, thus permitting water under pressure to fill the conduit 81, the pipe "T" 69 and the conduit 71. The manual surge valve 47, together with the electrically operated solenoid rinse valve 72 and the electrically operated solenoid surge valve 68 are closed. Under these conditions, it will be understood that water under pressure extends to the ouput side of the check valve 77 where it is stopped by the check valve so that no water flows in the system.

With the system in this condition, the surge valve 68 is opened by the controller/timer 86, allowing water from the pressure tank to pass through check valve 54, thence through normally open emergency valve 79, through the now electrically opened solenoid surge valve 68 and then through the conduits 66 and 41, and into the conduit 16 which extends to the bottom 14 of the well. As soon as water commences to run from the pressure tank through the path described, the pressure in the tank is progressively reduced until it reaches the pre-set lower limit of approximately 40 PSI, for example, whereupon the pressure switch 14 energizes the well pump 8 so that water continues to flow from the pressure tank but also is augmented by water that is now being pumped from the well by the pump 8. This water from both these sources is of course deposited into the bottom of the well under pressure and causes the water and sediment in the bottom of the well to be stirred and mixed and elevated with the water that is contained within the bottom of the well to above the level of the pump intake 9.

The pressure in the pressure tank will of course continue to fall, and when this pressure drops to the "cracking" pressure of approximately 35 PSI of the check valve 54, water will no longer flow from the pressure tank through the check valve 54. This causes there to be retained within the pressure tank several gallons of clean water under pressure which is available in the event it is needed during a nocturnal surging process. The retained pressure in the pressure tank is sufficient to prevent the dirty water circulated through the surge circuit from entering the pressure tank.

It will of course be understood that as soon as the check valve 54 closes at the "cracking" pressure of 35 PSI, since the pump is still activated, water will continue to attempt to pass into the conduit 6 leading to the pressure tank. However, because the pressure remaining in the pressure tank is greater than the pressure exerted by the water being pumped by the pump 8, no water will flow at this time into the conduit 6 and into the pressure tank. Rather, water being pumped by the pump 8 passes upwardly through the cross-member 49, the normally open emergency shut-off valve 79, and through the now open electrically operated solenoid surge valve 68 and back down through conduit 66 and 41 into the downwell conduit 16.

Since the pressure in the pressure tank 13 is sufficient to prevent water from the pump to be pumped into the conduit 6, it will be apparent that dirty water that is being circulated in the surge circuit cannot enter the conduit 6 or the pressure tank. The mud and detritus collected at the well bottom that has been displaced upwardly and diluted with water from the tank is now raised above the pump intake 9 and is thus available to the pump to be pumped out of the well.

At the completion of the surging cycle through the surge circuit, which may selectively be set for a time interval to insure complete admixture and elevation or upward displacement of the water content from the bottom of the well with whatever sediment and detritus is contained therein, the controller/timer closes the electrically operated solenoid surge valve 68 and simultaneously opens the electrically operated solenoid rinse valve 72. Since the pump 8 is still activated and pumping water, the water which has been mixed with mud and detritus which has been displaced to above the pump intake 9, is now pumped up through drop-pipe 6, through the auxiliary pump check valve 77, through the normally open emergency shut-off valve 79, and through the now electrically energized and open solenoid rinse valve 72, causing the water, mud and detritus to be discharged through the pipe union 74 and whatever conduit (not shown) is connected thereto for disposition of the fouled water onto the ground or into an appropriate container for proper and sanitary disposition. The sequence is repeated according to the settings selectively entered into the controller/timer by the well owner or by a well technician working for the well owner. It should be noted that the auxiliary pump check valve 77 and the check valve 12 are provided to prevent the pressure tank from emptying water into the well in the event of failure of the pump check valve 18.

It will thus be seen that in the same way that watering systems are set up with different cycles that turn on water sprinklers at different times and for different intervals to water lawns, shrubs and trees, so too the control system for remediating a water well that has been fouled over time may be set to effectively periodically energize the substantially automatically operable surge and rinse circuits and cycles to pump fouled water from the bottom of the well. It should be understood that the timing and programming cycles may be set so that the entire process may be repeated several times, for instance during the interval between midnight and dawn, thus insuring that during daylight hours when water is usually drawn from a well, the water that will issue therefrom is clean, clear and potable.

Having thus described the invention, what is believed to be new and novel and sought to be protected by Letters Patent of the United States is as follows.

I claim:

1. Means for removing unwanted substances from the stagnant bottom of a well by injecting sufficient water from a reservoir thereof into the well's stagnant bottom to displace the unwanted substances to a position above the pump where they can then be pumped from the well, comprising in combination, a) a water well for pumping water from below the surface of the earth; and b) a water well rehabilitation apparatus for cleaning the stagnant bottom region of the water well of its stagnant water and contaminated contents;

c) said water well including a bore extending beyond a natural source of water at an indeterminate depth;

d) said water well rehabilitation apparatus including a pump having inlet and outlet ports submerged in the water above the stagnant bottom region of the bore;

e) an elongated conduit extending into the bore and connected at its lower end to the outlet port of the pump and its upper end connected to a water reservoir at the surface;

f) said water reservoir connected to the aforementioned rehabilitation apparatus, said rehabilitation apparatus including means for injecting into the well pressurized water from a source thereof into the stagnant bottom of the bore below said pump whereby the contents of the well's stagnant bottom below said pump are displaced and elevated to above the pump inlet port whereby activation of the pump purges the well of said displaced and elevated contaminated contents;

g) wherein said reservoir is a pressure tank;

h) said pump is electrically activated; and i) a pressure switch sensitive to the pressure in said pressure tank activates said pump when the contents of said pressure tank have been injected into the well's stagnant bottom causing the pressure in said pressure tank to fall below a preset lower limit.

2. The combination according to claim 1, wherein said water well rehabilitation apparatus includes a second conduit having an upper end and a lower end, said lower end extending into the well bore region near the well's stagnant bottom, and means connecting the upper end of said conduit to said source of pressurized water and selectively actuable to inject pressurized water from said source into the stagnant region in the well's bottom.

3. The combination according to claim 2, wherein said means selectively actuable to inject pressurized water from said source into the stagnant region in the well's bottom includes a plurality of electrically actuable solenoid valves, at least one check valve, and a controller/timer assembly connected to said plurality of solenoid valves to control the interval and sequence of operation thereof to perform a surge cycle during which the contaminated contents of the stagnant bottom region below the pump intake port are displaced upward to a level above the pump inlet port, and a rinse cycle during which said contaminated contents above the pump inlet port are pumped out of the well to the surface for appropriate disposition thereof.

4. The combination according to claim 3, wherein said controller/timer is programmable to cyclically perform said water well rehabilitation cycles, and thereafter periodically perform said cyclical rehabilitation whereby to maintain the cleanliness of the stagnant bottom region of the well.

\* \* \* \* \*